US008838734B2

(12) United States Patent
Allamaraju et al.

(10) Patent No.: US 8,838,734 B2
(45) Date of Patent: *Sep. 16, 2014

(54) SYSTEM AND METHOD FOR SUPPORTING CONSUMER ENTITLEMENTS IN FEDERATE PORTAL

(75) Inventors: Subrahmanyam Allamaraju, San Ramon, CA (US); Nathan Edward Lipke, San Jose, CA (US); Kevin Blair Frender, Longmont, CO (US); Jeffrey Elliot Mueller, Broomfield, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/960,172

(22) Filed: Dec. 3, 2010

(65) Prior Publication Data
US 2011/0078577 A1 Mar. 31, 2011

Related U.S. Application Data

(63) Continuation of application No. 12/126,632, filed on May 23, 2008, now Pat. No. 7,849,157.

(60) Provisional application No. 60/939,820, filed on May 23, 2007.

(51) Int. Cl.
*G06F 15/16* (2006.01)
*G06F 3/00* (2006.01)
*G06Q 10/00* (2012.01)

(52) U.S. Cl.
CPC .................................. *G06Q 10/00* (2013.01)
USPC ........... 709/217; 709/201; 709/203; 709/218; 709/219; 715/742

(58) Field of Classification Search
USPC .................................. 709/201, 203, 217–219
See application file for complete search history.

(56) References Cited

U.S. PATENT DOCUMENTS

| 7,533,142 | B2 | 5/2009 | Ng et al. |
| 7,653,659 | B2 | 1/2010 | Kussmaul et al. |
| 7,716,665 | B2 | 5/2010 | Buehler et al. |
| 2004/0230947 | A1* | 11/2004 | Bales et al. ................... 717/110 |
| 2005/0256940 | A1* | 11/2005 | Henderson et al. ........... 709/219 |
| 2005/0267789 | A1* | 12/2005 | Satyadas et al. .................. 705/7 |
| 2006/0053376 | A1 | 3/2006 | Ng et al. |
| 2006/0230062 | A1* | 10/2006 | Roy-Chowdhury et al. ........................ 707/103 X |
| 2006/0235935 | A1 | 10/2006 | Ng |
| 2009/0113310 | A1 | 4/2009 | Appleyard et al. |

* cited by examiner

*Primary Examiner* — Ranodhi Serrao
*Assistant Examiner* — Farrukh Hussain
(74) *Attorney, Agent, or Firm* — Meyer IP Law Group

(57) ABSTRACT

A system and method can support a federated portal using a producer web application on a web server and a plurality of consumer web applications. The producer web application is a container web application that hosts a plurality of portlet applications that are deployed and maintained separately. Each consumer web application is adapted to collect and present available portlet applications hosted on the producer web application and offer them as a unified portal to end users. Upon receiving a request from a consumer web application, said producer web application can map the consumer web application to one particular role in a role set which includes a plurality of roles, check for portlet applications that are available based on the particular role, and response to the consumer web application with a message that describes the available portlet applications hosted in the producer web application.

20 Claims, 3 Drawing Sheets

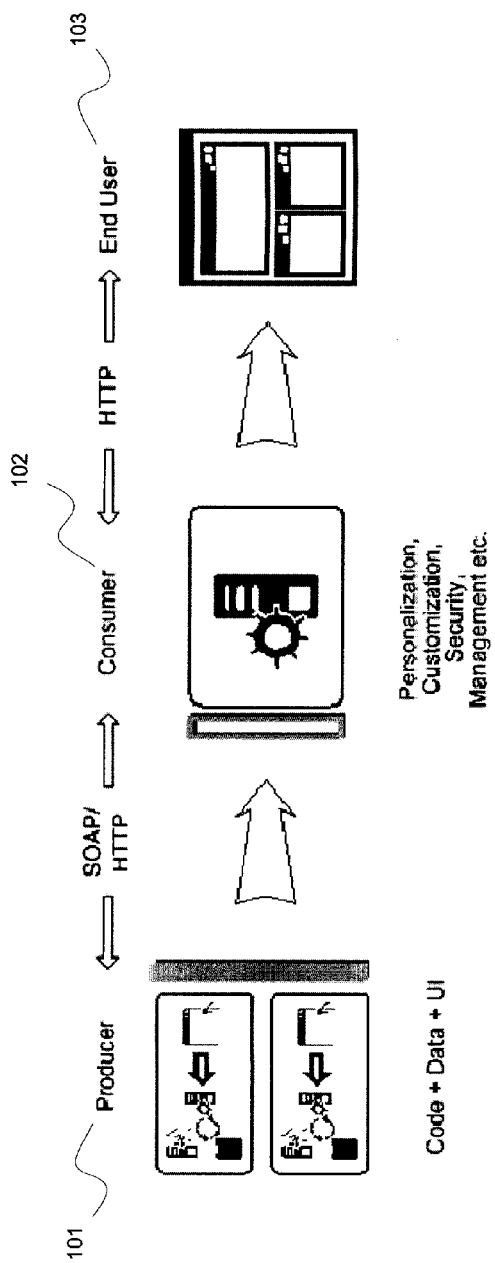
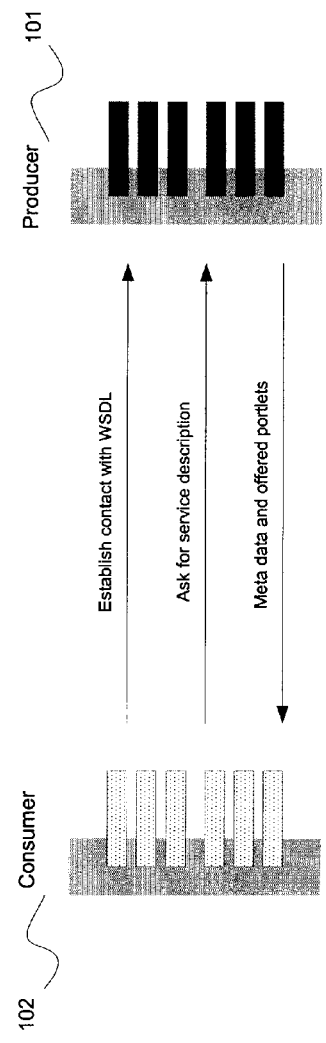

SYSTEM AND METHOD FOR SUPPORTING CONSUMER ENTITLEMENTS IN FEDERATE PORTAL

CLAIM TO PRIORITY

This application is a continuation of U.S. patent application Ser. No. 12/126,632 entitled "SYSTEM AND METHOD FOR CONSUMER ENTITLEMENTS IN PORTAL SERVICE" filed May 23, 2008, now U.S. Pat. No. 7,849,157, which claims the benefit of priority under 35 U.S.C. §119(e) to U.S. Provisional Patent Application entitled "SYSTEM AND METHOD FOR CONSUMER ENTITLEMENT" Ser. No. 60/939,820, filed on May 23, 2007, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates the field of supporting consumer entitlements in federated portal development.

BACKGROUND OF THE INVENTION

Web Services for Remote Portlets (WSRP) is a web services protocol for aggregating content and interactive web applications from remote sources. WSRP is a key standard that underlies federated portals. Essentially, WSRP allows remote, distributed portlets to be brought together at runtime into a unified portal page.

Web Services for Remote Portlets provide both application and presentation logic. This is different from standard web services, or data-oriented web services, which contain business logic but lack presentation logic and thus require that every client implement that logic on its own.

While the data-oriented approach works well in many implementations, it is not well suited for dynamically integrating business applications. For example, to integrate an order status web service into a commerce portal, one would need to write code to display the results of the status services into the portal. Using WSRP, with the presentation logic included in the web service, one can achieve the aggregation of applications and services dynamically. One no longer needs to develop the presentation logic in order to do the integration; one can simply request the order status service to show up as a portlet inside the commerce portal at a predetermined location.

SUMMARY OF THE INVENTION

In one embodiment of the present invention, A system and method can support a federated portal using a producer web application on a web server and a plurality of consumer web applications. The producer web application is a container web application that hosts a plurality of portlet applications that are deployed and maintained separately. Each consumer web application is adapted to collect and present available portlet applications hosted on the producer web application and offer them as a unified portal to end users. Upon receiving a request from a consumer web application, said producer web application can map the consumer web application to one particular role in a role set which includes a plurality of roles, check for portlet applications that are available based on the particular role, and response to the consumer web application with a message that describes the available portlet applications hosted in the producer web application.

BRIEF DESCRIPTION OF THE DRAWINGS

FIG. 1A illustrates the components of a federated portal.

FIG. 1B illustrates the communication between the components of a federated portal, a Consumer and a Producer.

DETAILED DESCRIPTION

Figure 2:
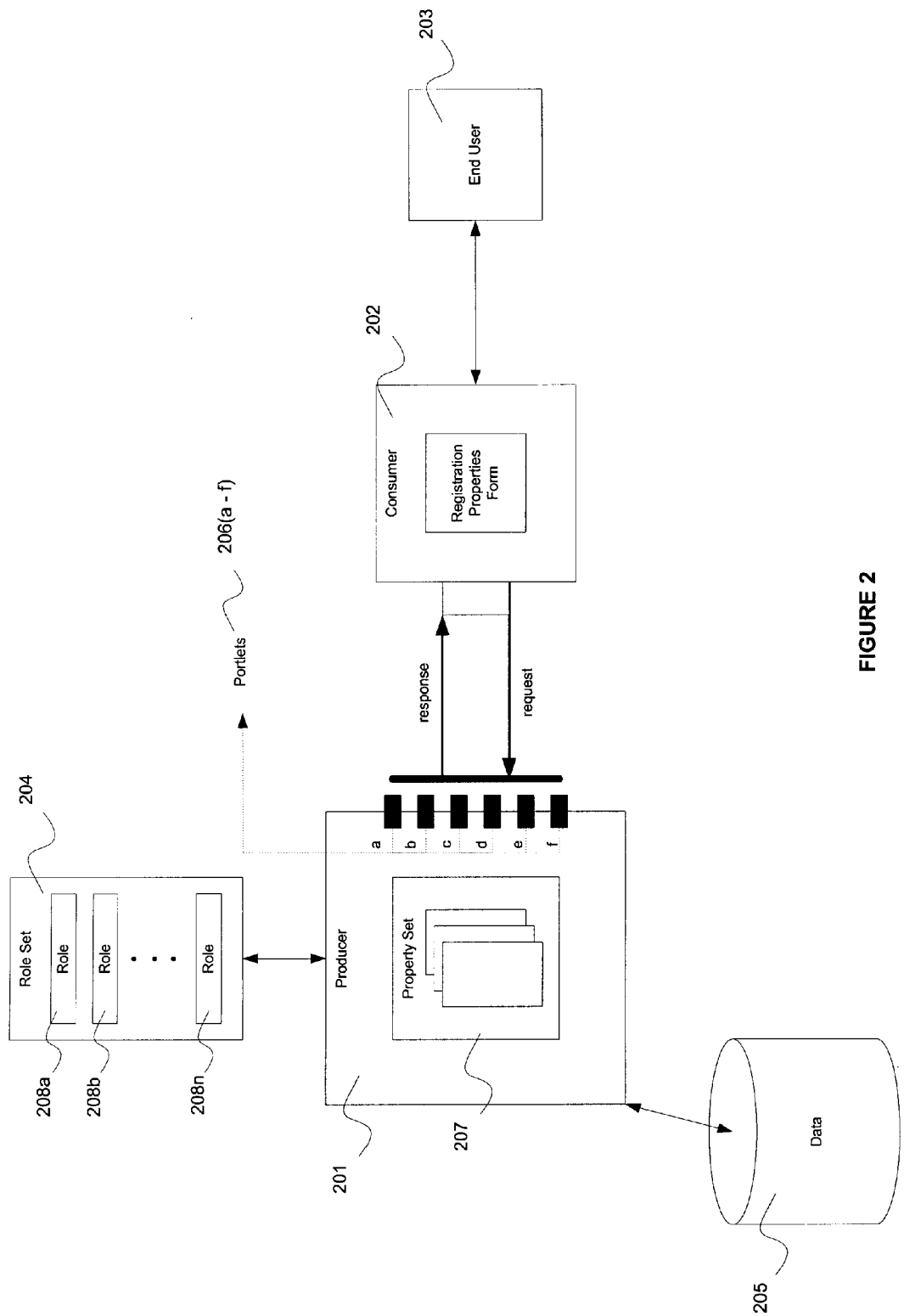
FIG. 2 is an illustration of an exemplary framework of supporting consumer entitlement that allows Producer web applications to decide which portlets to offer to Consumer web applications in accordance with one embodiment of the present invention.

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the WebLogic Portal environment as an example for a federated portal environment and WebLogic Portal WSRP implementation as an example for portal WSRP implementation. It will be apparent to those skilled in the art that other types of federated portal environment and portal WSRP implementation can be used without limitation.

A federated portal can be a portal that includes remotely distributed resources, including remote portlets, books, and pages. These remote resources can be collected and brought together at runtime to a portal application called a consumer, which presents the federated portal to end users. Unlike a non-federated, entirely local portal, in most cases, the individual remote parts of a federated portal can be maintained, updated, and released independently without redeploying the consumer portal in which they are surfaced.

Federated portals can be:
  a. Distributed—Portlets can be deployed on remote systems across the enterprise.
  b. Decoupled—The portal and its portlets may not depend upon one another. In most cases, remote portlets can be maintained and deployed separately from the federated portal.
  c. Collaborative—Remote portlets can communicate and share data.
  d. Plug-and-Play—One can easily locate and use remote portlets. Programming is usually not required to consume remote portlets.
  e. Standards based—federated portals such as WebLogic Portal federated portals can be built upon open standards, such as WSRP, SOAP, WSDL, SAML, UDDI, and WS-Security.

FIG. 1A illustrates the components of a federated portal. Note that a portal WSRP implementation, such as the WebLogic Portal WSRP implementation, can allow the addition of typical Portal services, such as personalization, customization, and user management. This can mean that remote portlets can be given the same look and feel and the same levels of portal security as local portlets.

A producer 101 can be a container web application that hosts portlets. Through proxy portlets, consumers 102 can collect and present remote portlets (portlets hosted on producers) to users 103. All application codes (page flows, backing files, Java classes, controls, EJBs, and so on) can reside on the producer. Consumers 102 may only receive fragments of markup from producers 101 which are collected and presented to users 103.

A consumer 102 is a web application that can collect remote portlets and offer them in a unified portal to end users who use a browser to view and interact with the portal. In addition to federating portlets, there can be federate books and pages. Typically, a consumer 102 does not include the business logic, data, or user interface parts of a portlet: it can simply collect user interface markup delivered from producers and presents that user interface to users.

Consumers 102 can be administration-centric. This can mean that administrators, rather than developers, typically focus their time on consumers. Administrators can locate and consume remote portlets, manage users, set up entitlements, and so on.

As shown in FIG. 1B, to consume 102 a remote portlet hosted on a producer 101, a consumer 102 can ask a producer 101 for information about the portlets it offers. The consumer 102 can first contact a producer 101 using the producer's WSDL URL. This initial contact can verify the availability of the producer 101 and its services. Next, the consumer 102 can ask the producer 101 for a description of the portlets it offers. The producer 101 can respond to the consumer with a SOAP message that describes the portlets and associated metadata that are offered by the producer 101.

A typical Producer implementation provides WSRP Consumers access to all available portlets. When two different consumers send a request to get the ServiceDescription from a Producer (via the getServiceDescription request), both Consumers get the same array of offeredPortlets. However, there can be situations when certain Consumers are allowed to use only certain Portlets on a given Producer. For example, a Producer may want to offer only certain kinds of portlets to a public portal Consumer, but offer more portlets to an internal HR portal Consumer.

One of the use cases can be to control portlets offered to a given Consumer based on who the Consumer is, in which case the administrators of the Producer can define rules to offer or not to offer a given portlet to a Consumer.

Other related use cases can include:
a. preventing a Consumer from customizing a portlet by sending a setPortletProperties request;
b. preventing a Consumer from cloning a portlet by sending a clonePortlet request;
c. preventing a Consumer from deleting a previously cloned portlet by sending a destroyPortlets request;
d. preventing a Consumer from viewing the properties of a portlet by sending a getPortletProperties or getPortletPropertyDescriptions request; and
e. preventing a user using a Consumer from customizing a portlet.

FIG. 2 is an illustration of an exemplary framework of supporting consumer entitlement that allows Producer web applications to decide which portlets to offer to Consumer web applications in accordance with one embodiment of the present invention.

In accordance with one embodiment of the present invention, with consumer entitlements, property values obtained during registration, among other things, can be used to provide a way for the producer to get finer grained control over provisioning of the portlets it offers. The implementation of this feature can use expressions to create role mappings based on property values provided by consumers during registration. For example, if producer A were to require that consumers provide values for properties X, Y and Z, it could create expressions that, at request time, assigned a consumer to role P if the property values they provided were m, n and o and to role Q if the property values they provided were d, e and f. The producer could then use these roles to set entitlements on portlets so that operation like view or edit or delete can only be performed by the specified roles. As a result, the WSRP producer can control WSRP consumers' access to portlets it provides by using property information provided during registration.

One embodiment of the present invention is a system to support consumer entitlement that allows Producer web applications 201 to decide which portlets 206(a-f) to offer to a Consumer web applications 202. Such a system can comprise a role set 204 which includes a plurality of roles 208(a-n); a Consumer web application 202 adapted to interact with end users 203; and a Producer web application 201 with a set of portlets 206(a-f) operable to be combined in a unified portal for end users. Here, the Producer web application 201 can operate to define a property set 207 that allows end users to input values for the property set 207; map the Consumer web application 202 to one particular role 208a in the role set 204; and check for portlets that are available among the set of portlets 206(a-f) based on the particular role 208a.

In one embodiment of the present invention, the Consumer web application 202 can collect a group of portlets from the set of portlets 206(a-f) of the Producer web application 201 and combine the group of portlets in a unified portal for end users 203.

In one embodiment of the present invention, there can be additional Producer web applications with additional sets of portlets, wherein the Consumer web application 202 can further collect portlets from the additional sets of portlets of the Producer web applications and can further combine all collected portlets in a unified portal for end users.

In one embodiment of the present invention, there can also be additional Consumer web applications adapted to interact with end users, wherein the Producer web application 201 can further map the additional Consumer web applications to corresponding particular roles in the role set and check for portlets that are available among the set of portlets based on each particular role for each additional Consumer web application.

In one embodiment of the present invention, the Producer web application 201 can describe the property set 207 as registration properties.

In one embodiment of the present invention, the Producer web application 201 can map the Consumer web application 202 to one particular role in the role set 204 based on the registration properties.

In one embodiment of the present invention, the Consumer web application 202 can pop up a form for entering registration property values.

In one embodiment of the present invention, there can also be a database 205, wherein the Producer web application 201 stores the registration properties in the database 205 and generates a registration handle which is returned to the Consumer web application 202.

Figure 3:
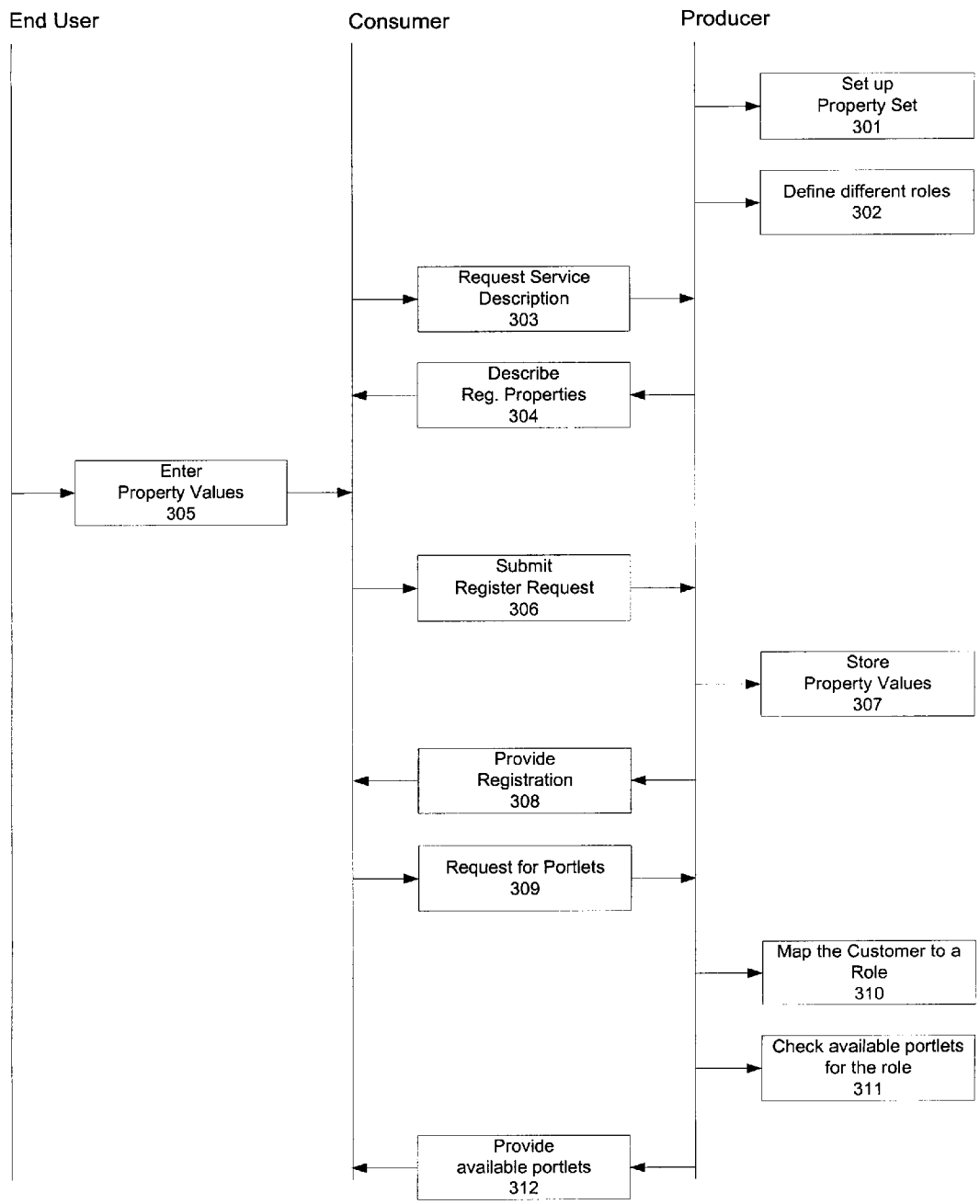
FIG. 3 is an illustration of an exemplary process of supporting consumer entitlement that allows Producer web applications to decide which portlets to offer to Consumer web applications in accordance with one embodiment of the present invention.

FIG. 3 is an illustration of an exemplary process of supporting consumer entitlement that allows Producer web applications to decide which portlets to offer to Consumer web applications in accordance with one embodiment of the present invention.

One embodiment of the present invention is a method to support consumer entitlement that allows Producer web applications 201 to decide which portlets 206(a-f) to offer to Consumer web applications 202. Such a method can comprise the steps of: defining a role set including a plurality of roles 302; setting up a property set with a plurality of properties 301; mapping a Consumer web application to a particular role within the role set based on the properties 310; and checking a Producer web application with a set of portlets for portlets that are available to the Consumer web application based on the particular role 311.

In one embodiment of the present invention, there can also be a step of receiving a request from a Consumer web application for service description 309.

In one embodiment of the present invention, there can also be a step of receiving a request from a Consumer web application for registration 306.

In one embodiment of the present invention, there can also be a step of describing the properties within the property set as registration properties to a Consumer web application 304.

In one embodiment of the present invention, there can also be a step of storing values of the registration properties associated with the Consumer web application to a database 307.

In one embodiment of the present invention, there can also be a step of generating a registration handle and returning it to the Consumer web application 308.

In one embodiment of the present invention, there can also be a step of mapping another Consumer web application to another particular role within the role set based on the properties.

In one embodiment of the present invention, there can also be a step of checking the Producer web application for portlets that are available to another Consumer web application based on another particular role.

One embodiment of the present invention is a method to support consumer entitlement that allows Producer web applications to decide which portlets to offer to Consumer web applications. Such a method can comprise the steps of: receiving property values from end users 305; mapping a consumer web application to a particular role within the role set based on the property values 310; checking a Producer web application with a set of portlets for portlets that are available to the Consumer web application based on the particular role 311; and providing the available portlets to the Consumer web application 312.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A system to support a federated portal, comprising: one or more microprocessors;
  a producer web application on a web server, running on the one or more microprocessors, wherein said producer web application is a container web application that hosts a plurality of portlet applications, wherein each of said plurality of portlet applications is deployed and maintained separately;

a plurality of consumer web applications, running on the one or more microprocessors, wherein each of said plurality of consumer web applications is adapted to collect and present portlet applications of said plurality of portlet applications, and offer the portlet applications as a unified portal to end users;

wherein each of said plurality of consumer web applications operates to perform the following steps at runtime in response to a request from an end user,
  request registration with said producer web application by providing a set of registration properties, and
  request portlet applications from said producer web application; and wherein, in response to requests from a consumer web application, said producer web application operates at runtime to
  use said registration properties to map said consumer web application to a particular role from a role set comprising a plurality of roles,
  use said particular role to determine which of said plurality of portlet applications are available portlet applications,
  use said particular role to set entitlements on said available portlets wherein the entitlements control operations on the available portlet applications, and
  provide said available portlet applications having said set entitlements to said consumer web application.

2. The system according to claim 1, wherein:
the producer web application operates to define a property set that allows the end users to input values for the property set, and generate said set of registration properties.

3. The system according to claim 2, wherein:
the producer web application transmits to said consumer web application a property set that allows the end users to input values for the property set, and generate said set of registration properties.

4. The system according to claim 2, wherein:
the consumer web application operates to pop up a form for entering said input values for the property set.

5. The system according to claim 2, wherein:
said producer web application generates a registration handle using the registration properties, and returns the registration handle to the consumer web application.

6. The system according to claim 2, further comprising:
a database, wherein the producer web application stores the registration properties in the database and generates a registration handle which is returned to the consumer web application.

7. The system according to claim 1, wherein:
the consumer web application receives only user interface markups for a user interface from each said producer web application, and present the user interface to the end users.

8. The system according to claim 1, wherein:
said producer web application transmits a message to said consumer web application wherein the message contains metadata that is offered by each said producer web application.

9. The system according to claim 1, wherein:
said producer web application provides a different set of available portlet applications to a different consumer web application that is associated with a different role.

10. A method to support a federated portal, comprising:
providing a producer web application on a web server, wherein said producer web application is a container web application that hosts a plurality of portlet applications, wherein each of said plurality of portlet applications is deployed and maintained separately;

providing a plurality of consumer web applications, wherein each of said plurality of consumer web applications is adapted to collect and present portlet applications of said plurality of portlet applications, and offer portlet applications as a unified portal to end users;

wherein each of said plurality of consumer web applications, in response to a request from an end user, performs steps at runtime comprising,
  requesting registration with said producer web application by providing a set of registration properties to said producer web application, and
  request portlet applications from said producer web application; and wherein, in response to requests from a consumer web application, said producer web application performs steps at runtime comprising,
  using said registration properties to, map said consumer web application to a particular role from a role set comprising a plurality of roles,
  using said particular role to determine which of said plurality of portlet applications are available portlet applications,
  using said particular role to set entitlements on said available portlets wherein the entitlements control operations on the available portlet applications, and
  providing said available portlet applications having said set entitlements to said consumer web application.

11. The method according to claim 10, wherein said requesting registration step comprises requesting registration with said producer web application by providing a set of registration properties and a service application to said producer web application.

12. The method according to claim 10, further comprising:
receiving said registration properties with said web producer application.

13. The method according to claim 10, further comprising:
describing a set of properties within a property set as registration properties to the consumer web application.

14. The method according to claim 13, further comprising:
storing values of the registration properties associated with the consumer web application to a database.

15. The method according to claim 14, further comprising:
generating a registration handle and returning the registration handle to the consumer web application.

16. The method according to claim 13, further comprising:
mapping another consumer web application in the plurality of consumer web applications to a different particular role within the role set.

17. The method according to claim 16, further comprising:
checking the producer web application for portlet applications that are available to the another consumer web application based on the different particular role.

18. A non-transitory machine readable storage medium to support a federated portal having instructions stored thereon that when executed cause a system to perform the steps comprising:
providing a producer web application on a web server, wherein said producer web application is a container web application that hosts a plurality of portlet applications, wherein each of said plurality of portlet applications is deployed and maintained separately;

providing a plurality of consumer web applications, wherein each of said plurality of consumer web applications is adapted to collect and present portlet applications of said plurality of portlet applications, and offer portlet applications as a unified portal to end users;

wherein each of said plurality of consumer web applications, in response to a request from an end use, performs steps at runtime, comprising, requesting registration with said producer web application by providing a set of registration properties to said producer web application, and request portlet applications from said producer web application; and wherein, in response to requests from a consumer web application, said producer web application performs steps at runtime comprising, using said registration properties to, map said consumer web application to a particular role from a role set comprising a plurality of roles, using said particular role to determine which of said plurality of portlet applications are available portlet applications, using said particular role to set entitlements on said available portlets wherein the entitlements control operations on the available portlet applications, and providing said available portlet applications having said set entitlements to said consumer web application.

19. The non-transitory machine readable storage medium of claim 18, having further instructions stored thereon that when executed cause a system to perform further steps comprising:

describing a set of properties within a property set as registration properties to the consumer web application.

20. The non-transitory machine readable storage medium of claim 18, having further instructions stored thereon that when executed cause a system to perform further steps comprising:

storing said registration properties associated with the consumer web application to a database.

* * * * *